United States Patent
Storath et al.

[11] Patent Number: 5,803,412
[45] Date of Patent: Sep. 8, 1998

[54] APPARATUS FOR MOUNTING A PLURALITY OF CONTROL ELEMENTS ON A VEHICLE DASHBOARD

[75] Inventors: Joachim Storath, Bad Neustadt; Walter Voll, Sandberg; Karl-Heinz Bauer, Bad Neustadt, all of Germany

[73] Assignee: Preh-Werke GmbH & Co. KG, Bad Neustadt, Germany

[21] Appl. No.: 692,259

[22] Filed: Aug. 5, 1996

[30] Foreign Application Priority Data

Aug. 5, 1995 [DE] Germany ............... 195 28 868.8

[51] Int. Cl.[6] .................................................. G12B 9/00
[52] U.S. Cl. ................... 248/27.1; 248/27.3; 248/222.11
[58] Field of Search .................... 248/27.1, 27.3, 248/222.11, 222.12

[56] References Cited

U.S. PATENT DOCUMENTS

| 2,250,231 | 7/1941 | Nodine ............................ 248/27.1 X |
| 3,645,353 | 2/1972 | Cope et al. ....................... 248/27.1 X |
| 4,340,795 | 7/1982 | Arthur .............................. 248/27.3 X |
| 4,555,983 | 12/1985 | Bolton et al. .................... 248/27.1 X |
| 4,699,341 | 10/1987 | Ponticelli ......................... 248/27.3 X |
| 4,812,133 | 3/1989 | Fleak et al. ...................... 248/27.3 X |
| 4,993,668 | 2/1991 | Inamura ............................... 248/27.3 |
| 5,004,634 | 4/1991 | Anthony .......................... 248/27.1 X |
| 5,174,621 | 12/1992 | Anderson ......................... 248/27.1 X |
| 5,217,190 | 6/1993 | Reed et al. ........................... 248/27.3 |
| 5,232,185 | 8/1993 | Schorr et al. ...................... 248/199.3 |
| 5,524,859 | 6/1996 | Squires et al. ................... 248/27.1 X |

FOREIGN PATENT DOCUMENTS 38 34 448 A1 11/1989 Germany .
43 26 910 A1 2/1994 Germany .

*Primary Examiner*—Donald P. Walsh
*Assistant Examiner*—Emmanuel M. Marcelo
*Attorney, Agent, or Firm*—Griffin, Butler Whisenhunt & Szipl, LLP

[57] ABSTRACT

An apparatus includes a plurality of control elements (3) on a dashboard (1) of a motor vehicle which are framed and covered by face plates (6) which are mounted after the control elements are mounted. Control element bodies of the control elements (3), are resiliently held relative to fixed attaching eyes (7), and spacings between control element bodies of individual control elements (3) and control element bodies and framing edges of the dashboard (1) are set by spacers (10) on the face plates (6). This arrangement achieves an uncomplicated mounting and a pleasing visual appearance.

10 Claims, 3 Drawing Sheets

APPARATUS FOR MOUNTING A PLURALITY OF CONTROL ELEMENTS ON A VEHICLE DASHBOARD

BACKGROUND OF THE INVENTION

This invention concerns an apparatus including a plurality of control elements on a motor vehicle dashboard, which control elements are framed and covered by face plates, after they are mounted.

In comparison with control elements which are assembled with great accuracy, a dashboard has large fabrication tolerances so that spaces between individual components attached to it vary so that face plates, or covering plates, which are mounted after the control elements are mounted, either tightly engage one another or have non-uniform spacings from one another, the former causing an unpleasant appearance.

A known measure for avoiding this is to fasten the control elements to dashboard members using a pattern, or gauge, at screw holes which allow large built-in tolerances.

This mounting, using patterns or gauges, makes the mounting quite expensive and cannot be used for replacing control elements in repair shops.

German patent publications DE 38 34 448 A1 and DE 43 46 910 A1 disclose arrangements of face plates and control elements which are springingly coupled to one another, however, these publications do not teach measures for preventing non-uniform spaces between face plates and control elements.

Because of this, it is an object of this invention to provide an apparatus which allows an advantageous mounting without gauges while producing a uniform spacing of mounted face plates of control elements.

SUMMARY OF THE INVENTION

According to principles of this invention, an apparatus includes a plurality of control elements on a motor vehicle dashboard, which are framed and covered by face plates. The control elements include resilient mounts for affixing them at fixed attaching eyes, or elements, and the face plates have spacers arranged thereon for determining spacings between individual control element bodies and framing edges of the dashboard.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
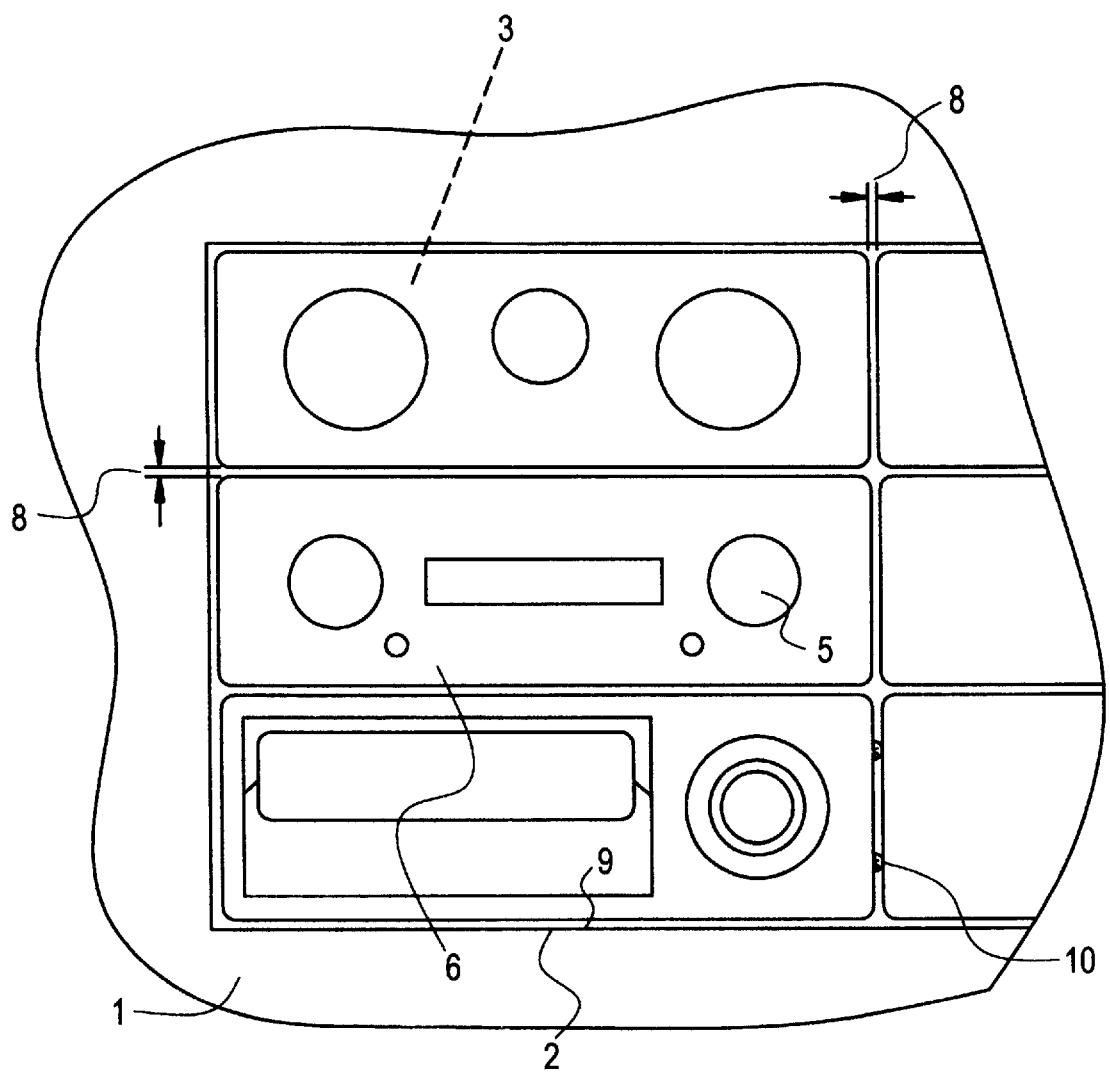
FIG. 1 is a front view (as seen by a driver) of a dashboard with a plurality of mounted control elements and attached face plates, or covering plates, as seen by a driver.

FIG. 1 shows a dashboard (1) of a motor vehicle with an opening 2 therein in which a plurality of control elements 3 are arranged and mounted. These control elements are for such things as, for example, adjusting an air conditioner, setting a car radio, etc.

The control elements 3 comprise control element bodies 4 (FIG. 2) with operational parts at 5, such as turn knobs, push buttons, and displays. The control elements are individually attached to appropriate attachment surfaces (not shown) for the dashboard (that is, here they are screwed thereto).

After all of the control elements 3 are mounted to the attachment surfaces of the dashboard the operational parts 5 thereof are framed and the control element bodies are framed and covered by face plates 6.

Figure 2:
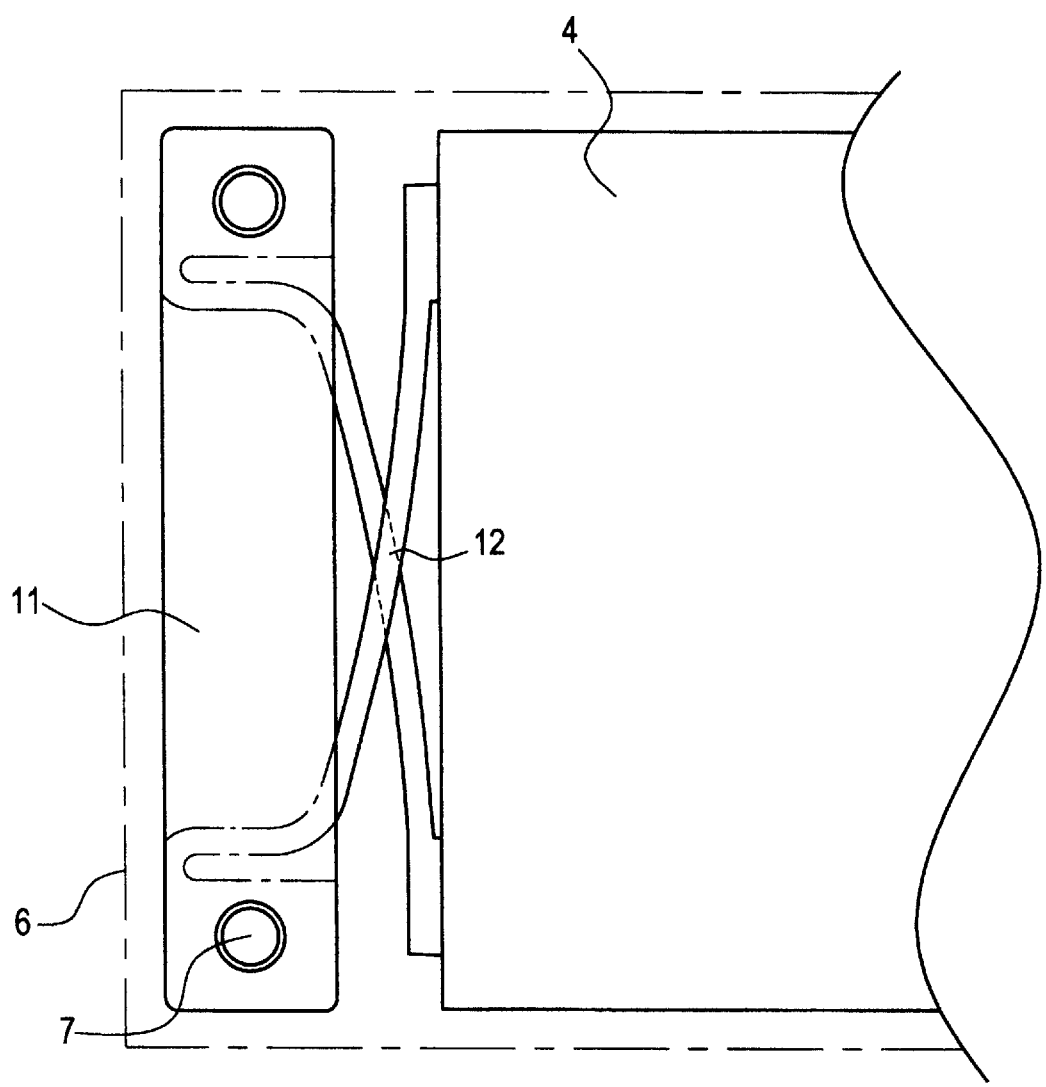
FIG. 2 is a simplified, enlarged, schematic front view, taken from the same direction as is FIG. 1, of a portion of a single control element, including its mount for the dashboard, but the dashboard not being shown and an outer edge of a facing plate being shown by a dashed line.

According to this invention, it is provided that the control element bodies 4, as compared to fixed attaching eyes (snapping rivets), or elements, 7 for attaching cleats 11 (which are attached to the dashboard) are springingly, or resiliently, held, and spacings 8 between the individual control element bodies of the control elements 3, and the control element bodies and edges 9 defined by the dashboard 1, are determined by spacers 10 which are attached to the face plates 6, as can be seen in FIG. 2 in which one control element body 4 is shown as an individual part, with a dash-dot line showing an outer edge of its face plate 6; thus, the face plate 6 covers the attaching eyes 7 and the spacers 10 are inserted between control element bodies 4 and between control element bodies 4 and edges 9. The control element bodies 4 and the face plates 6 are, as described below, coupled with one another at clipping zones 13, or arms 14 (see FIG. 3).

It is beneficial that the attaching eyes, or elements 7, are arranged in a pair on the attaching ledge, or cleat 11, to be coupled to the control element body 4 by means of a spring part 12.

The control element body 4, spring part 12, and attaching cleat 11 can be injection molded of an elastic resinous plastic as one piece, or, alternately, the control element body 4 and the attaching cleat 11 can be coupled via a spring part 12 made of metal.

This is accomplished by making the control element part 4 and the attaching cleat 11 with the same plastic of which the plastic spring part 12 is injection molded, or the control element body 4 and the attaching cleat 11 can be screwed, riveted, or welded to the spring part 12.

Figure 3:
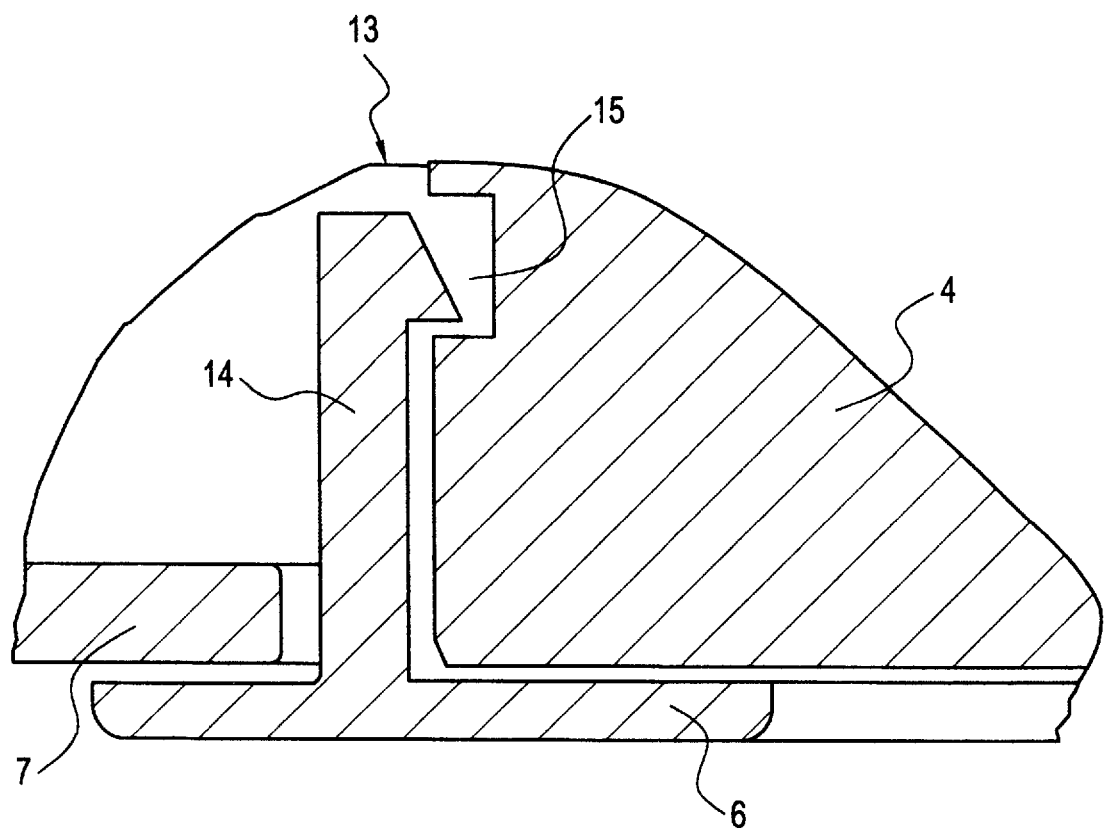
FIG. 3 is a side cross-sectional view, taken in a plane substantially perpendicular to the dashboard, showing a clip mounting a face plate of this invention to a control element.

So that the face plates 6 will be easy to mount on the control element bodies it is provided that the control bodies 4 and the face plates 6 have the interengaging snapping, or clipping zones, 13 that is, for example, the arms 14 on the face plate 6 which bend outwardly and snap into openings 15 in the control element bodies of the control elements 3 (FIG. 3).

The unique arrangement of this invention makes it possible to cover and frame, a plurality of control element bodies 4 and operational parts 5 with one common face plate 6 with the benefit of reducing parts and simplifying mounting.

While the invention has been particularly shown and described with reference to a preferred embodiment, it will be understood by those of ordinary skill in the art that various changes in form and detail may be made therein without departing from the spirit and scope of the invention.

The invention claimed is:

1. Apparatus including a plurality of control elements for being mounted on a motor vehicle dashboard, with the control elements, after they have been mounted, being framed and covered by at least one face plate, wherein:

each of the control elements includes a control element body and a spring attachment for springingly attaching the control element body of the control element to a fixed portion of the dashboard so that the control element body springingly moves against a spring bias relative to the fixed portion of the dashboard;

the face plate includes an attachment member for mounting the at least one face plate on one of the control element bodies;

said face plate includes spacers mounted thereon for being inserted between individual control element bodies and control element bodies and edges defined by the dashboard for causing the control element bodies to move against the bias of the spring attachment for determining spaces between individual control element bodies and control element bodies and edges defined by the dashboard.

2. Apparatus as in claim 1 wherein each spring attachment includes an attaching cleat for being fixedly mounted on the dashboard and a spring for coupling the attaching cleat to the control element body of the control element for thereby allowing the springing movement against a spring bias.

3. Apparatus as in claim 2, wherein the control element body and the attaching cleat are coupled together via a metallic spring.

4. Apparatus as in claim 2, wherein the control element body and the attaching cleat are made of a resinous plastic of which the spring is also injection molded.

5. An apparatus as in claim 2, wherein the control element body and the attaching cleat are attached to the spring by means of fastening elements.

6. Apparatus as in claim 2 wherein the spring is attached to the attaching cleat at two attaching positions.

7. Apparatus as in claim 2, wherein the control element body, the spring, and the attaching cleat are injection molded as one piece.

8. Apparatus as in claim 1 wherein at least one of the control element bodies and the face plate have means for snapping together for mounting the face plate on the at least one control element body.

9. Apparatus as in claim 1 wherein a plurality of the control element bodies are framed and covered by a common face plate.

10. Apparatus as in claim 1 wherein there are a plurality of face plates, each being fixedly attached to one of said control element bodies by its attachment member and each including spacers thereon for being inserted between individual control element bodies and control element bodies and edges defined by the dashboard.

* * * * *